Dec. 22, 1953  G. D. WOOD  2,663,359
AUXILIARY SEAT FOR AUTOMOBILES AND THE LIKE
Filed Aug. 24, 1951
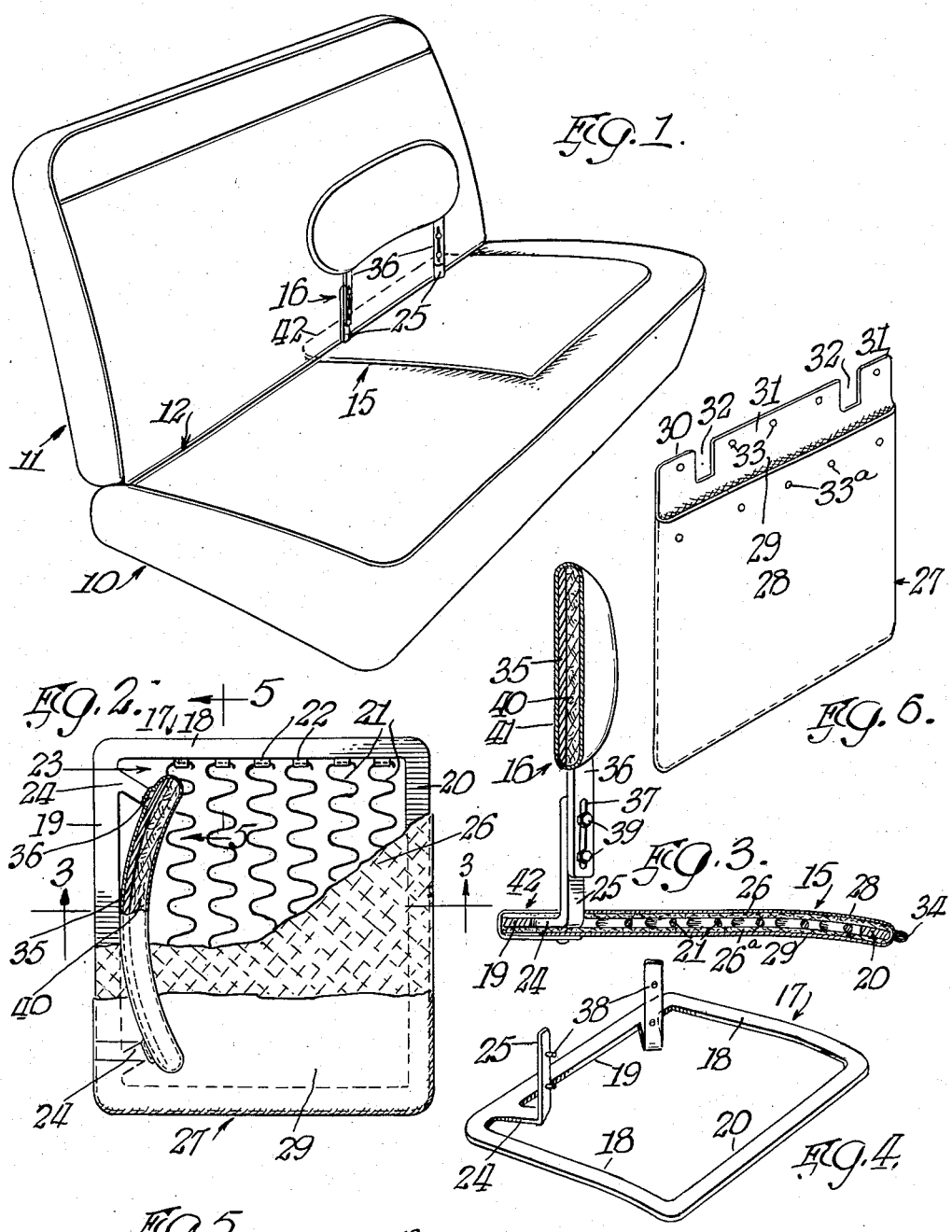

Patented Dec. 22, 1953

2,663,359

UNITED STATES PATENT OFFICE 2,663,359

AUXILIARY SEAT FOR AUTOMOBILES AND THE LIKE

Glenn D. Wood, Elkhart, Ind., assignor to Posture Research Institute, Inc., Elkhart, Ind., a corporation of Indiana Application August 24, 1951, Serial No. 243,405

1 Claim. (Cl. 155—131)

This invention relates to improvements in auxiliary seats for automobiles and the like and it consists of the matters hereinafter described and more particularly pointed out in the appended claim.

The seats of the conventional automobile, and especially the driver's seat, have certain objections which the present invention seeks to overcome. Some driver's seats are of such front to rear depth and of such height as to make the occupant thereof quite uncomfortable in long rides, because the seat does not afford a proper sitting and stabilizing posture for the driver. Also, such a seat, as well as the associated back, is usually deeply and softly cushioned and while it may feel comfortable when depressed by the hand, the driver "sinks" into the same. In time, the seat becomes quite warm and induces perspiration and an unconscious change in posture so gradually as to be unnoticed by the driver until such posture has caused fatigue and other sensory effects. The driver then tries to overcome such fatigue and effects by shifting into different positions on the seat. In some instances drivers pay more attention to shifting the position on the seat to overcome said effects than they do to road conditions and traffic, so that accidents are more apt to happen in driving.

One of the objects of the invention is to provide an auxiliary seat that may be placed upon the seat of an automobile to produce a better and stabilized posture, which will reduce fatigue and attending discomforts, as well as perspiration and which will overcome the necessity of the driver to shift positions frequently as is now the case.

Another object of the invention is to provide an auxiliary seat of this kind, which though not unyielding will prevent the driver from 'sinking' into the cushion of the seat and which will remain relatively cool by affording a greater degree of ventilation than that afforded by the automobile seat itself.

Also, it is an object of the invention to provide an auxiliary seat for this purpose which affords a better and more comfortable support for the lumbar region of the back and for the upper portions of the legs, and which reduces the area of pressure in both instances, together with the feeling of fatigue induced by such pressure.

Again, it is an object of the invention to provide a seat of this kind which, when placed as intended upon the driver's side of an automobile seat, will still afford the driver proper vision through the windshield.

Furthermore, it is an object of the invention to provide a seat of this kind which includes a better fitting back rest that is disposed forwardly of the rear edge of the seat so as to leave the rear margin of the seat exposed for an inserted holding engagement in the seam forming the junction of the back and the seat of the automobile.

Again, it is an object of the invention to provide an auxiliary seat of the kind mentioned which is relatively inexpensive to manufacture; is light in weight; strong and rigid to resist warping and twisting in use, and which may be applied to an automobile seat, by inexperienced persons, without the aid of tools or fastening devices.

The above objects of the invention, as well as others, together with the advantages thereof, will more fully appear as the specification proceeds.

In the drawing:

Fig. 1 is a perspective view of the front seat of a conventional automobile, with the improved auxiliary seat in position on the driver's side thereof.

Fig. 2 is a top plan view of the improved auxiliary seat, on a scale enlarged over that of Fig. 1, with parts of the seat member thereof broken away better to illustrate the structure.

Fig. 3 is a front to rear vertical sectional view through the seat as taken on the line 3—3 of Fig. 2.

Fig. 4 is a perspective view of the rigid frame of the seat member.

Fig. 5 is a detail vertical sectional view through parts at one side of the seat member as taken on the line 5—5 and on a scale enlarged over that of Fig. 2.

Fig. 6 is a perspective view of a certain envelope for enclosing the seat member of the seat, to form the covering therefor.

In general the improved auxiliary seat is adapted to be shipped in a knocked down condition for assembly by and application to an automobile seat by the purchaser. It includes a relatively thin flat rectangular seat member and a back rest rising from a portion of the seat member forwardly of its rear edge, thus leaving a margin of the seat member rearwardly of the back rest which is designed and adapted for insertion in the seam at the bottom of the back and the rear of the automobile seat to which it is applied and serves to hold the seat in position.

The seat member includes a relatively rigid outline or border frame which surrounds a seat portion within the same. While the seat portion has some flexibility it is not so soft and flexible as the usual automobile seat cushion. The back rest, which is curved to fit the driver's back, is mounted upon longitudinally adjustable uprights supported from the rigid frame and passing up through a part of the seat member within the frame, whereby the height of the back rest relatively to the seat member of the auxiliary seat may be easily adjusted to that height most comfortable for the driver. When the auxiliary seat has been placed in position on the automobile seat the back rest of the auxiliary seat engages the back cushion of the automobile seat. Thus the auxiliary seat and associated back rest may have some degree of movement relative to those parts of the automobile seat with which they are engaged.

Referring now in detail to that embodiment of the invention illustrated in the drawings there is shown in Fig. 1 a typical front seat of a conventional automobile, which includes a seat cushion 10 and a back cushion 11. These cushions are separate cushions, the bottom of the back cushion meeting the rear of the seat cushion yieldably along the line 12. The active surface of the seat cushion is generally inclined upwardly and forwardly from this seam at an angle slightly above the horizontal while the active surface of the back cushion is tilted upwardly and rearwardly from the perpendicular, starting from said meeting line 12.

The improved auxiliary seat comprises primarily but two parts namely a seat member 15 and a back rest 16. The seat member embodies therein a rigid open and substantially rectangular frame 17 that best appears in Fig. 4 and which includes side members 18—18, a rear member 19 and a front member 20. These members, which are flat metallic bars, are joined together at their ends to provide the rounded corners for the frame.

Within said frame and extending transversely thereof is a plurality of front, rear and intermediate flat sinuous springs 21. The end of each spring is hingedly connected to associated clips 22 so fastened to the side members 18 of the frame as to dispose the springs within or between the planes of the top and bottom surfaces of the frame members. The front spring is arranged substantially close to the front frame member while the rear spring is separated from the rear member of the frame by a space 23, as appears best in Fig. 2.

Extending diagonally inwardly from adjacent the ends of the rear member 19 of the frame 17 are arms 24 which terminate in the space 23 near the rear spring as upstanding posts or columns 25, which form part of the support for the back rest, as will later appear. The front portion of the frame, for a little more than about a quarter of its front to rear depth, is curved slightly downwardly, better to fit the curved front portion of the seat cushion 10.

The top and the bottom surfaces of the frame and the springs, before mentioned, are covered by paddings 26—26a and the assembly thus produced is enclosed in an envelope 27, such as shown in Fig. 6, which forms a covering for the seat member 15 as a whole. This covering has top and bottom walls 28—29, one of which is shorter than the other, the long wall having end and intermediate flap extensions 30—31 separated by spaces 32 which permit the passage of the posts 25 upwardly through the same. In the finished seat structure the flaps 30—31 are turned under the rear of the seat member, these flaps and associated margin of the shorter wall of the envelope carrying coacting parts of snap fasteners 33—33a to secure the flaps in the closed condition. The edges of the parts of the envelope are bound by suitable finishing tapes 34. Of course the upper padding 26 has recesses in the rear margin thereof to accommodate the passage of the posts 25 upwardly through the same.

The back rest 16 includes a base 35 of sheet material such as wood or the like, which is curved from side to side, end portions of the base having depending arms 36 so attached at their upper ends thereto that their lower ends match up with and engage the front faces of the posts 25. Each arm 36 has a longitudinal slot 37 therein and each post 25 carries bolts 38 that extend through said slots from the rear to receive nuts 39. With the arrangement described the arms 36 may be adjusted upwardly or downwardly of the posts 25 so as to dispose the back rest at the desired elevation relative to the seat member.

On the front face of the back rest base is a suitable padding 40 such as foam rubber or other suitable padding, the back and its padding being enclosed in covering material 41.

It is to be noted that a marginal part 42 of the seat member extends rearwardly of the posts 25 and arms 36 and in applying the auxiliary seat to the automobile seat on the driver's side thereof, this marginal part is inserted into the juncture line 12 between the bottom of the back cushion and the top of the seat cushion, until stopped by the engagement of the back rest 16 with the front face of the cushion 11 of the automobile seat back. With said margin so inserted the remainder of said seat member lies flat upon the seat cushion 10 with the front curved margin of the seat member following the front curvature of the seat cushion but terminating short of the front thereof.

When the auxiliary seat is occupied by a driver, his back is supported by the back rest 16 for a considerable area because of the fit afforded by the transverse curvature thereof. Also, when the driver occupies the seat member the spring structure 21, while affording some depression, will not permit a "sinking" into the seat cushion. Therefore, the under sides of the upper leg portions of the driver do not engage the front member of the frame 17 for the transmission of a pressure thereto.

As the seat member is neither rigid nor soft, the area of contact between the driver's body part engaged thereon is reduced and therefore there is less friction and resultant heat at this point to produce perspiration and irritation. Therefore, the driver has a greater feeling of comfort and coolness.

Should the driver desire to push or stretch the torso rearwardly, as is often the case, the posts 25 will yield for this purpose, until stopped by the resistance of the back cushion 11 to such movement.

It is to be noted that the seat member is relatively thin and is not overcushioned or overstuffed. Therefore, the height added to the seat is not appreciable and the occupant's line of vision is not raised to such an extent as unduly to limit vision through the windshield of the automobile.

I claim as my invention:

An auxiliary seat for use in conjunction with an automobile seat and the like embodying therein means providing a seat member having a relatively rigid peripheral portion, laterally spaced uprights at the rear of said seat portion, inwardly of and supported by a part of said rigid peripheral portion and defining a margin rearwardly of said uprights for insertion in the seam between the bottom of the back cushion and the rear of the seat cushion of an automobile, and a back rest supported by said uprights and adapted for engagement against said back cushion when said margin of the seat member is disposed in said seam, and an envelope-like member enclosing said seat member and including top and bottom coverings, one of which is provided in one margin with recesses to accommodate said uprights, with flaps between and at each side of said recess adapted for detachable connection with the associated margin of the other covering.

GLENN D. WOOD.

References Cited in the file of this patent

UNITED STATES PATENTS

| Number | Name | Date |
|---|---|---|
| 1,555,526 | Smith | Sept. 29, 1925 |
| 1,687,826 | Burkhard | Oct. 16, 1928 |
| 2,119,023 | Pickard | May 31, 1938 |
| 2,307,331 | Parker, Jr. | June 5, 1943 |
| 2,449,500 | Nordmark | Sept. 14, 1948 |
| 2,587,194 | Mitchell | Feb. 26, 1952 |
| 2,602,487 | Flint | July 8, 1952 |